(12) United States Patent
Usami (10) Patent No.: US 7,191,302 B2
(45) Date of Patent: Mar. 13, 2007

(54) MEMORY CONTROL DEVICE FOR CONTROLLING TRANSMISSION OF DATA SIGNALS

(75) Inventor: Hajime Usami, Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 333 days.

(21) Appl. No.: 10/395,386

(22) Filed: Mar. 25, 2003

(65) Prior Publication Data
US 2003/0185070 A1   Oct. 2, 2003

(30) Foreign Application Priority Data
Mar. 27, 2002   (JP) .............................. 2002-089993

(51) Int. Cl.
*G06F 12/00* (2006.01)
*G11C 7/00* (2006.01)
(52) U.S. Cl. .................. 711/167; 711/154; 365/189.05
(58) Field of Classification Search ................ 711/167, 711/154; 365/189.05
See application file for complete search history.

(56) References Cited

U.S. PATENT DOCUMENTS 4,381,552 A   4/1983   Nocilini et al.
4,841,440 A   6/1989   Yonezu et al.
5,167,024 A   11/1992   Smith et al.
5,892,981 A   4/1999   Wiggers
6,256,716 B1   7/2001   Pham
6,535,968 B2   3/2003   Pham

FOREIGN PATENT DOCUMENTS

| EP | 0 679 982 A1 | 11/1995 |
|---|---|---|
| JP | S-49-33421 | 9/1974 |
| JP | U-61-103748 | 7/1986 |
| JP | A-1-117541 | 4/1989 |
| JP | A-05-94414 | 4/1993 |
| JP | A-5-094414 | 4/1993 |
| JP | A 7-302132 | 11/1995 |
| JP | A 10-16357 | 1/1998 |
| JP | A 11-14891 | 1/1999 |
| JP | A-2000-242600 | 9/2000 |
| JP | A 2001-505684 | 4/2001 |

*Primary Examiner*—Jack A. Lane
(74) *Attorney, Agent, or Firm*—Oliff & Berridge, PLC (57) ABSTRACT

An ASIC that includes a data latch for latching a data signal from a CPU and a buffer for holding the data signal output from the latch. When presently latched signal is at a higher electric potential than the data signal outputted to the buffer, that is, when then the data signal from the CPU changes from an H state to an L state, then the ASIC delays output of the buffered data signal to a memory (a pair of DIMMs) for one or more periods of the synchronization clock.

14 Claims, 8 Drawing Sheets

MEMORY CONTROL DEVICE FOR CONTROLLING TRANSMISSION OF DATA SIGNALS

BACKGROUND OF THE INVENTION

1. Field of the Invention

The present invention relates to a memory control device.

2. Description of the Related Art

In recent years, cellular telephones, printers, scanners and other such apparatuses are provided with a custom IC called an ASIC (Application Specific Integrated Circuit), to achieve compactness, high-performance, and high-quality. The ASIC is an IC composed by combining various basic circuits to specialize for a specific usage purpose, and is convenient because a main portion of a control circuit in the apparatus can be realized with one chip. In accordance with the conventional printer apparatus, the ASIC is used to control transmission and reception of a data signal between a CPU governing controls and a memory device performing transmission and reception of data to and from the CPU.

On the other hand, in a memory device equipped with a DRAM (Dynamic Random Access Memory) operating in synchronization with the clock, for example, an SDRAM (Synchronous DRAM) or a DDR SDRAM (Double Data Rate SDRAM), the data transmission and reception based on the synchronization clock is performed. In order to control the memory device, when a data signal is outputted to a data bus connecting the ASIC and the memory device, the following signals are used for the control: a data enable signal (hereinafter, referred to as a "data_enable signal") and a data out signal (hereinafter, referred to as a "data_out signal"). The data_enable signal is for controlling whether to output data to or to input data from the memory device, and is in either a high level (hereinafter, referred to as "H") or a low level (hereinafter, referred to as "L") state. The data_out signal is used as the data signal when the data_enable signal indicates that data is to be output to the memory device. The data_out signal is also in either an H or L state. Then, in the ASIC and the memory device, data signal processing such as transmission and reception and storage are performed at a timing of a rise of the synchronization clock.

Incidentally, the ASIC includes an internal buffer for performing 3-state output, wherein the data_out signal is outputted to the data bus only when the state of the data_enable signal is H.

SUMMARY OF THE INVENTION

However, wiring distances from the output source of respective signals to the buffer inside the ASIC are not necessarily the same. Due to these differences in the wiring distances, a slight delay occurs in the timing of the data_enable signal and the data_out signal which are transmitted to the buffer. There is no problem if the data_enable signal is transmitted to the buffer at an earlier timing than the data_out signal, but the data signal that is outputted from the buffer to the memory device may be adversely affected if the data_out signal had changed, for example, from a H state to a L state.

That is, the data_out signal sent from the buffer of the ASIC as a data signal to the memory device can reflect off the boundary between different impedances at the memory device and on the transmission route to the memory device.

Figure 1:
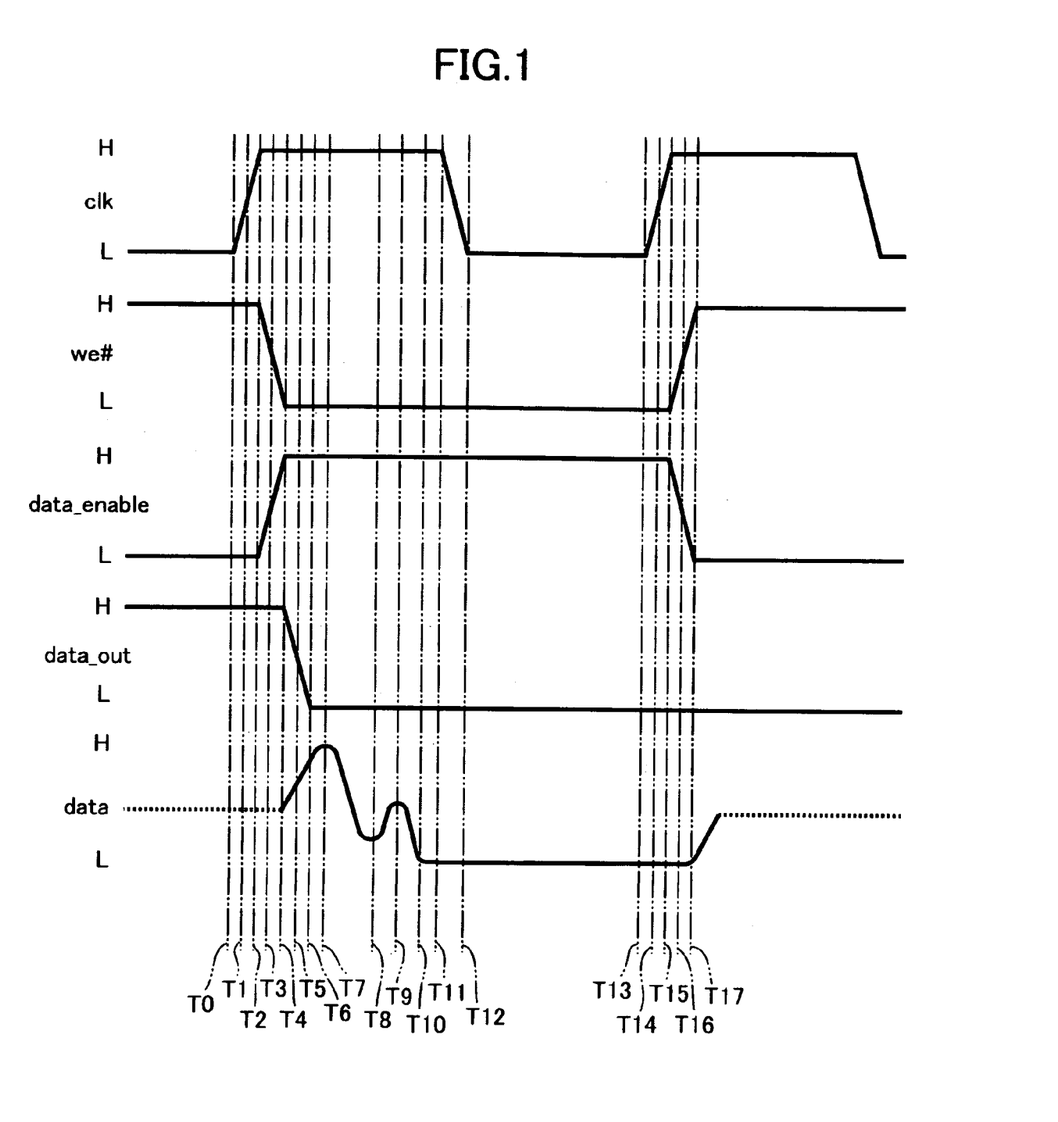
FIG. 1 is a timing chart showing a relationship between a data_enable signal and the data_out signal, when a frequency of a synchronization clock is low.
Figure 2:
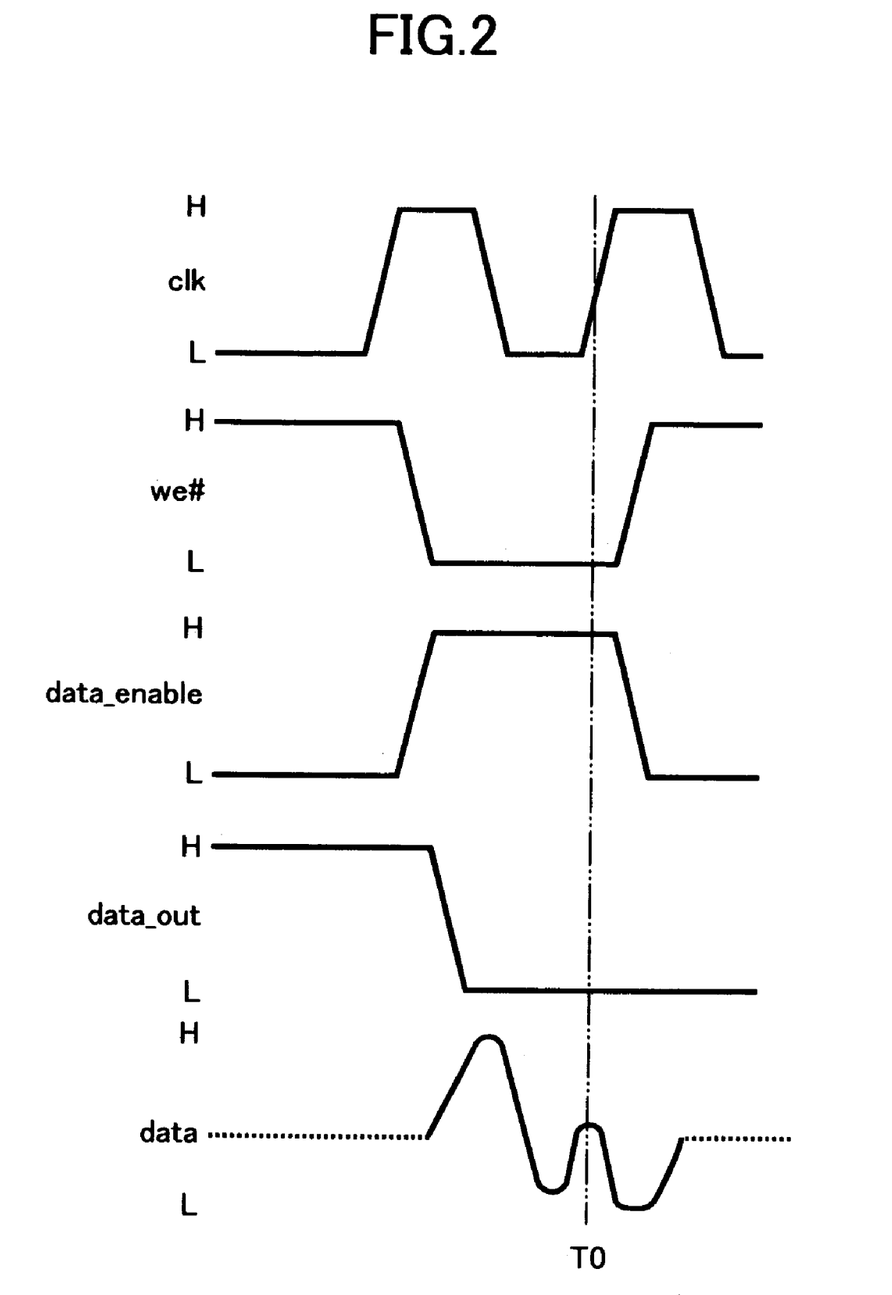
FIG. 2 is a timing chart showing a relationship between the data_enable signal and the data_out signal, when a frequency of a synchronization clock is fast.

The reflected data signal can combine with the data_out signal being output from the buffer. The signal transmitted is from the ASIC does not stabilize until the reflected signal attenuates. Influence from this reflection can be striking when the data_out signal changes H. L states, This situation will be described using the examples shown in FIGS. 1 and 2. FIG. 1 is a timing chart showing a relationship between the data_enable signal and the data_out signal at a low frequency (slow) synchronization clock. FIG. 2 is a timing chart showing a relationship between the data_enable signal and the data_out signal at a high frequency (fast) synchronization clock. Note that for example, in a memory device driven at a voltage of 3.3 V, the processing is performed at approximately 0 V for the L state, and approximately 3.3 V for the H state. However, an in-between state of, for example, 0.8 through 2 V is a state which cannot be judged as either one. In the timing chart, an interim vicinity in the state change between H and L is a threshold for switching between H and L.

As described above, the ASIC and the memory device perform control operations in synchronization with the synchronization clock signal (hereinafter, referred to as a "clk signal") in which the H and the L states alternate each given period. Note that data reflecting the state of the data signal from the ASIC is stored in the memory device when a write enable signal (hereinafter, referred to as a "we# signal") is H, but not stored when the we# signal is L. In this storage operation, if the state of the we# signal is L when the state of the clk signal changes from L to H, that is, at the time of the rising edge of the clk signal, then data reflecting the state of the data signal transmitted from the ASIC to the memory device is stored in the memory device as data. For example, if the state of the data signal is H, then a "1"0 is stored, and if the state is L, a "0" is stored.

In the example of FIG. 1, a "0 " is to be stored in a cycle after a "1" was stored in the previous cycle. Therefore, the ASIC transmits L-state data to the memory device in synchronization with the clk signal. As shown in FIG. 1, the buffer is first in an input state at timing T0 because the state of the data_enable signal is L. Therefore, although the state of the data_out signal is H due to processing (not shown in the diagram) before T0, the data_out signal is not outputted from the buffer. Then, processes for transmitting the data signal from the ASIC to the memory device is started from timing T2, in synchronization with the timing when the clk signal state changes from L to H near timing T1. However, the data_enable signal and the data_out signal are actually transmitted to the buffer at a slightly delayed timing because of internal signal transmission delays inside the ASIC. That is, the state of the data_enable signal changes from L to H at timing T2 to T4 and the data_out signal changes at the timing T4.

The data signal is in a high impedance state while no data_out signal is outputted from the buffer. Therefore, the memory device cannot distinguish the state of the data signal. The buffer changes to an output state when the data_enable signal state switches from L to H near timing T3. The data_out signal state is outputted from the buffer to the memory device at this time Because the state of the data_out signal is H at the timing T3, the state of the data signal transmitted to the memory device starts to change from L to H, but at a slightly later timing T4 because of influence from a substrate load and the like. Once the state of the data_out signal switches from H to L at timing T5, the state of the data signal also starts to change from H to L, but at a slightly later timing T7.

The state of the data_enable signal is maintained after the timing T4, and the state of the data_out signal is maintained after timing T6. Therefore, the state of the data signal transmitted to the memory device also continues to change to L, and it temporarily becomes the L state near timing T8.

However, in this example the H-state data signal transmitted to the memory device at timing T7 is reflected from the impedance boundary developed between the memory device and the ASIC from their different impedances. The reflected H-state data signal combines with the L-state data_out signal being outputted from the ASIC and is again transmitted to the memory device. This combination of the reflected H-state data signal and the L-state data_out signal appears at timing T8 and peaks at timing T9. The reflected H-state data signal attenuates to a negligible level by timing T10, so the state of the data signal reverts to L. Therefore, the L state of the data_out signal inputted from the CPU to the buffer is transmitted to and stored in the memory device.

The clk signal changes state to L at timing T11 to T12 at back to H at timing T13 to T15. Near timing T14 of the rise of a second period clk signal, the memory device performs processes to store the data signal based on the transmitted data signal. Incidentally, the we# signal changes from H to L state at timing T2 to T4, and the L state is maintained even at the timing T14. Since the state of the we# signal is L at the timing T14, the memory device references the state of the data signal at this timing, and stores the data based on this state of the data signal. In this example, "0" is stored into the memory device at this time because the state of the data signal is L.

Next, the data_enable signal changes from H to L from timing T15 to T17, but the output from the buffer when the data_enable signal switches from H to L at timing T16. Therefore, the state of the data signal is changed from low to the high impedance state from at a slightly later timing T17, whereupon the data signal becomes invalid.

However, the frequency of the synchronization clock has increased in recent years because of increased performance of the ASIC. Therefore, per-unit processing time has become so short that the internal delay of the signal transmission inside the ASIC can no longer be ignored. The same memory control as described above when performed at a higher clk signal frequency will be described with reference to FIG. 2. Timing T0 indicates the rising edge of the second period of the clk signal. At this time, the state of the we# signal is L so a data storage process is performed. However, at this timing the state of the data signal is being influenced by the reflected data signal and so has not completely changed to L. Therefore, the memory device cannot distinguish whether the state of the data signal is H or L, resulting in a data writing error. Therefore, unless impedance of the memory device is similar to the ASIC so that reflection is negligible, operation can be unstable and the memory device and the ASIC can have compatibility problems.

The present invention has been made to solve the above-mentioned problems, and therefore has as an object to provide a memory control device in which a control signal for transmission timing of a data signal synchronized to a synchronization clock and sent to a memory device performing data transmission and reception with a CPU is delayed, to thereby prevent influence of a reflective wave occurring at the transmission time due to a state change in the data signal.

In order to resolve the above-mentioned problems, A memory control device according to an aspect of the present invention controls transmission of data signals from a CPU to a memory device based on a synchronization clock that cyclically repeats a predetermined state. The CPU outputs a data signal and a write start signal. The memory control device includes a data controller, a signal line, and a memory control signal generation unit.

The data controller includes a data latch that latches the data signal from the CPU. The data controller outputs the data signal latched in the data latch as a latched data signal.

The signal line is for transmitting the data signal outputted from the data controller to the memory device.

The memory control signal generation unit receives the write start signal from the CPU and the synchronization clock. The memory control signal generation unit generates and outputs an output controlling signal and a storage controlling signal based on the write start signal and the predetermined state of the synchronization clock. The output controlling signal controls the data controller to output the latched data signal to the data bus. The storage controlling signal controls the memory device to store the data signal that the data controller outputted to the data bus. The memory control signal generation unit controls timing of at least one of output of the output controlling signal to control timing that the data controller outputs the latched data signal onto the signal line and output of the storage controlling signal to control timing that the memory device stores the data signal on the data signal line.

A memory control device according to another aspect of the present invention controls transmission of data signals from a CPU to a memory device based on a synchronization clock that cyclically repeats a predetermined state. The CPU outputs a data signal and a write start signal. The memory control device includes an input line, a data latch, a data out line, a buffer, a signal line, a detector, and a memory control signal generation unit.

The input line receives the data signal from the CPU.

The data latch is connected to the input line. The data latch latches the data signal from the input line as a latched data signal and outputs the latched data signal.

The data out line is connected to the data latch and receives the latched data signal output from data latch.

The buffer stores the latched data signal from the data out line and outputs the latched data signal as a data signal.

The signal line is connected to the buffer and to the memory device and receives the data signal output from the buffer.

The detector detects a state of the data signal on the input line and a state of the latched data signal on the data out line.

The memory control signal generation unit receives the synchronization clock. The memory control signal generation unit generates and outputs a strobe signal, a data enable signal, and a write enable signal. The strobe signal is for controlling timing that the data latch outputs the latched data signal. The data enable signal is for controlling timing that the buffer outputs the data signal. The write enable signal is for controlling timing that the memory device stores the data signal from the signal line. At a present predetermined state of the synchronization clock, the memory control signal generation unit compares the states detected by the detector for the data signal on the input line and the latched data signal on the data out line. When the states of the data signal on the input line and the latched data signal on the data out line are different, the memory control signal generation unit outputs the strobe signal at the present predetermined state of the synchronization clock and outputs the data enable signal and the write enable signal at a next predetermined state of the synchronization clock.

DETAILED DESCRIPTION OF THE PREFERRED EMBODIMENTS

Next, an ASIC 1 according to an embodiment of the present invention will be explained with reference to FIGS. 3 and 4. FIG; 3 is a block diagram showing the ASIC 1 connected between a CPU 10 and two Dual Inline Memory Modules (DIMMs) 16 and 17.

The ASIC 1 controls transmission of data signals to and from the CPU 10 and the DIMMs 16 and 17. The ASIC 1 includes a memory control circuit 2 and a buffer 7. The memory control circuit 2 includes a data control circuit 3 and a memory control signal generation circuit 4. When the CPU 10 and the DIMMs 16 and 17 perform the transmission and reception of a data signal, the data control circuit 3 temporarily latches the data signal, and creates synchronization timing of the transmission and reception, The data control circuit 3 is bidirectionally connected to the CPU 10. The data control circuit 3 is provided with: a data latch 5 for temporarily latching a data signal when the CPU 10 outputs the data signal to the DIMMs 16 and 17; and a detection circuit 6 for detecting a data signal outputted from the CPU and inputted into the data latch 5 and a data signal outputted from the data latch 5 and inputted into the DIMMs 16 and 17.

Further, the memory control signal generation circuit 4 is bidirectionally connected to the CPU 10, and generates control signals for controlling the data control circuit 3, the buffer 7, the DIMMs 16 and 17, and the like, which are all connected to the memory control signal generation circuit 4. Further, the memory control signal generation circuit 4 is connected to the detection circuit 6 in the data control circuit 3, and receives the data signal detected by the detection circuit 6.

The buffer 7 is a bidirectional buffer provided inside the ASIC to adjust the timing of the data signal transmissions and receptions between the memory control circuit 2 and the DIMMs 16 and 17 connected via a data bus 15. The buffer 7 is composed of an IN buffer 7a for inputting the data signal (data_in) outputted from the DIMMs 16 and 17 into the data control circuit 3 and an OUT buffer 7b for outputting the data signal (data_out signal) outputted by the data control circuit 3 into the DIMMs 16 and 17. Further, the OUT buffer 7b is connected to and receives a control signal (data_enable signal) from the memory control signal generation circuit 4.

Table 1 is a truth value table showing outputs from a OUT buffer 7b. As shown in Table 1, the data outputted from the OUT buffer 7b has three states according to the two input signals data_enable signal and data_out signal. When the state of the data_enable signal is "L", the data signal is in a high impedance state (Hi-Z), regardless of the state of the data_out signal. In this high impedance state, the output from the OUT buffer 7b is invalid, and the input to the IN buffer 7a becomes valid. Further, when the state of the data_enable signal is "H", the data_out signal is outputted just as it is from the OUT buffer 7b. In other words, when the state of the data_out signal is "L", the state of the data signal also becomes "L", and when state of the data_out signal is "H", the state of the data signal also becomes "H".

TABLE 1

| data enable | data out | data |
|---|---|---|
| L | L | Hi-Z |
| L | H | Hi-Z |
| H | L | L output |
| H | H | H output |

The DIMMs 16 and 17 each have a 168-pin terminal on which a plurality of SDRAMs or other such clock synchronization-type DRAMS are mounted. The DRAMs have a cell structure composed of a plurality of capacitors for accumulating electronic charges to perform storage. The memory control signal generation circuit 4 in the ASIC 1 transmits various signals for accessing the individual cells of the DRAMs. The various signals include a row address strobe signal (ras#), a column address strobe signal (cas#), an address signal (address), and a we# signal for performing the data storage. Note that a signal line for each type of control signal is connected one-by-one to the DIMMs 16 and 17, and the same type of control line is shared between the DIMMs 16 and 17.

Further, the data bus 15 is a data bus for connecting the ASIC 1 and the DIMMs 16 and 17 and performing data signal transmission and reception. Note that controls of the CPU 10, the ASIC 1 and the DIMMs 16 and 17 are performed in synchronization with a clock signal clk signal generated by an oscillator 11.

Figure 3:
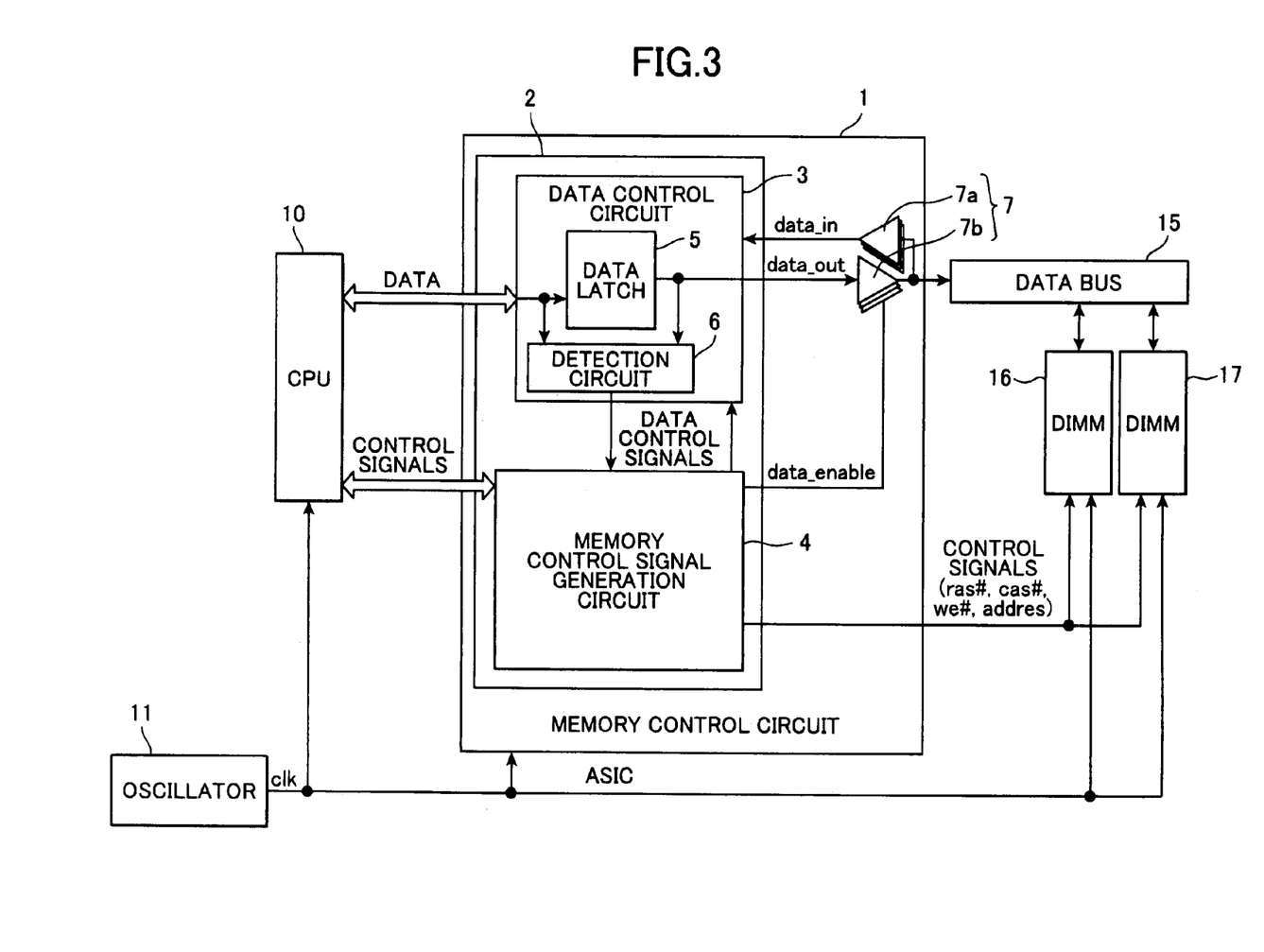
FIG. 3 is a block diagram showing an ASIC according to an embodiment of the present invention and a CPU and a memory device (DIMMs) connected to the ASIC.
Figure 4:
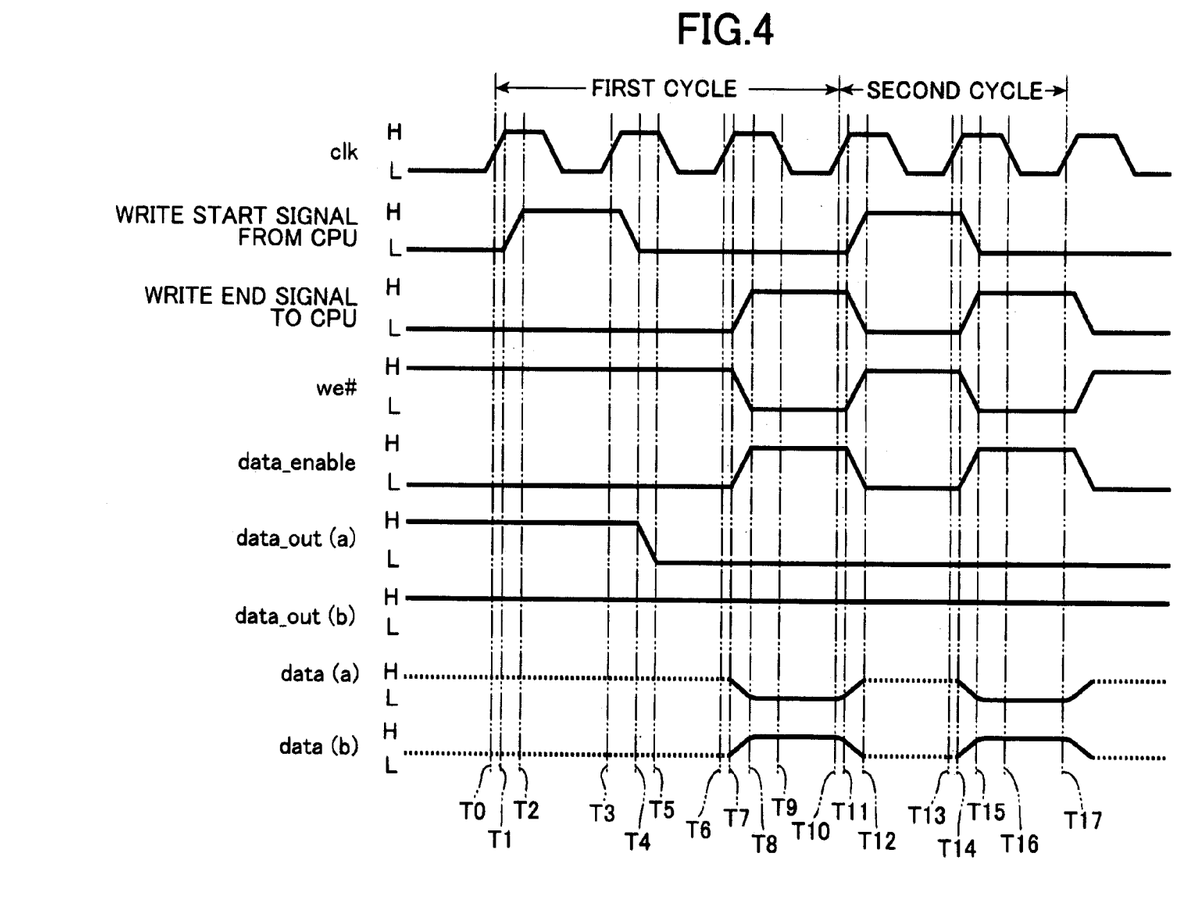
FIG. 4 is a timing chart showing states of data signals controlled by the ASIC to store data in the DIMMs.

Next, an explanation is given regarding an operation of the memory control circuit 2 of this embodiment with reference to FIGS. 3 and 4. FIG. 4 is a timing chart showing the output to the DIMMs 16 and 17 delayed in the memory control circuit 2 because one of the data_out signals has changed state, that is, changed from a high state to a low state or from a low state to a high state, from a previous period of the synchronization clock. The memory control circuit 2 delays output of the data signals to the DIMMs 16 and 17 when a data signal changes state in this way. It should be noted that the DIMMs 16 and 17 each have 64 data input terminals and so can simultaneously store a plurality of data signals transmitted from the CPU 10. The memory control circuit 2 delays output of all the data signals to the DIMMs 16, 17 when even one of the data signals at any one period of the synchronization clock has changed states compared with the previous period of the synchronization clock. The following explanation will be given regarding the delay control for two exemplary data signals (a) and (b) in FIG. 4.

As shown in FIG. 4, when data is to be stored in the DIMMs 16 and 17, the CPU 10 sends a first cycle data signal and a write start signal to the ASIC 1 at timing T1 in synchronization with a rise of the clk signal at timing T0. The data control circuit 3 in the ASIC 1 receives the data signal, and latches it in the data latch 5. The write start signal from the CPU 10 starts changing from L to H at timing T1 to T2 and reaches H by the rise of a second period clk signal at timing T3. Therefore, at timing T3 the memory control signal generation circuit 4 generates the strobe signal to the data latch 5, the data_enable signal to the OUT buffer 7b, and the we# signal to the DIMMs 16 and 17. Note that although the data_enable signal and the we# signal are generated at this time, they are not yet output from the memory control signal generation circuit 4 so do not appear in FIG. 4. Also, the states of the strobe signal and the data_enable signal are positive logic. This means that their normal state is L, and their state for outputting the latched data signal the OUT buffer 7b is H. Further, the we# signal is negative logic. This means that its normal state is H state and its output state is L.

Further, at the timing T3, the detection circuit 6 of the data control circuit 3 sends, for each signal line, the state (high or low electric potential) of the data signal on a CPU side (the CPU 10 side) and a buffer side (the OUT buffer 7b side) of the data latch 5 to the memory control signal generation circuit 4. The state on the CPU side of the data latch 5 is the state of the data signal sent from the CPU 10, and in this example corresponds to the state (either H or L) of the data signal that was latched in the data latch 5 at the timing T3. The state of the signal line on the buffer side is the state (either H or L) of the signal outputted as the data out signal at the timing of the previous cycle of the clk signal.

Then, the memory control signal generation circuit 4 compares the CPU side state signal and the buffer side state signal transmitted from the detection circuit 6. When the states are the same, this means that all of the signals from the CPU 10 remained the same respective H or L state as the state of the signal previously output from the CPU 10. In such a case, the data_enable signal and the we# signal generated at the timing T3 are outputted to the OUT buffer 7b and to the DIMMs 16 and 17, respectively. On the other hand, when the states of the CPU side state signal and the buffer side state signal transmitted from the detection circuit 6 differ from each other, that is, when one signal is H and the other is L, a control is performed to delay the data_enable signal and the we# signal generated at the timing T3 for one cycle of the clk signal before outputting the data_enable signal and the we# signal.

Specifically, at timing T3, an exclusive logical sum (ExclusiveOR) of the two signals outputted from the detection circuit 6 is taken. Then, the logical sum (OR) is taken for the resultant exclusive logical sum and the negative logic we# signal to the DIMMs 16 and 17. Similarly, the negative (NOT) of the exclusive logical sum of the two signals from the detection circuit 6 is taken, and a logical product (AND) of the negation and the data_enable signal is outputted to the OUT buffer 7b.

Although not shown in the drawings, in the present example one the data signals from the CPU 10, that is, either the (a) side or the (b) side, is at an L-state. and the other is at an H-state at timing T3, but both were at an H-state during the previous cycle before the timing T0. Therefore, the states of the two signals inputted from the detection circuit 6 to the memory control signal generation circuit 4 at the timing T3 are different from each other. Therefore, the memory control signal generation circuit 4 does not output the data_enable signal and the we# signal from the CPU 10 at timing T3. The memory control signal generation circuit 4 outputs only the strobe signal to the data latch 5, and the two data signals latched to the data latch 5 are outputted to the OUT buffer 7b as a data_out signal (a) and a data_out signal (b).

Because the data signal was output from the data latch 5 at timing T3, the state of the data_out signal (a) changes from H to L at timing T4 to T5. However, the state of the data_out signal (b) remains as H. At the timing of the second cycle clk signal rise (timing T6), the state on the CPU side and on the buffer side of the data latch 5 are transmitted for all signal lines again from the detection circuit 6 to the memory control signal generation circuit 4. Because the memory control signal generation circuit 4 did not send a write end signal to the CPU 10, the CPU 10 does not send out the next data signal to the ASIC 1. Therefore, the state on the CPU side of the data latch 5 remains in the same state as at the timing T3. As mentioned previously, the latched data signal was outputted due to the strobe signal outputted from the memory control signal generation circuit 4 at the timing T3, so at timing T6 signal states at the buffer side of the data latch 5 and at the CPU side state are the same. Therefore, the memory control signal generation circuit 4 sends the data_enable signal and the we# signal to the OUT buffer 7b and the DIMMs 16 and 17, respectively.

The memory control signal generation circuit 4 sends the data_enable signal and the we# signal at timing T7, and each signal status change is completed before timing T8. Further, the memory control signal generation circuit 4 sends a write end signal to the CPU 10 simultaneously with sending these signals.

The OUT buffer 7b is no longer in the high impedance state from timing T8 because the data_enable signal changed to the H state. Therefore, the data_out signal (a) is outputted as data (a), and the data_out signal (b) is outputted as data (b), respectively, from the OUT buffer 7b to the data bus 15. Further, the state of the we# signal at the DIMMs 16 and 17 is L at timing T10, which is a timing at a third period rise of the clk signal. Therefore, the states of the data signals at this timing are referenced, and data is recorded accordingly in the DIMMs 16, 17. In this case, the state of the data (a) is L. Therefore, "0" is recorded in an SDRAM cell designated by the ras#, the cas# and the address signal. Further, the state of the data (b) is H. Therefore, "1" is similarly recorded into a corresponding cell of the SDRAM. Then, the we# signal, the data_enable signal, and the write end signal are changed during the first period of the clk signal to their original inactive states at timing T10 to T11. In other words, the state of the we# signal is changed to H, the state of the data_enable signal is changed to L, and the state of the write enable signal is changed to L.

On the other hand, the state of the write end signal sent from the memory control signal generation circuit 4 to the CPU 10 at the timing T7 is changed to H at timing T8, and is recognized by the CPU 10 at timing T9 of the falling edge of the clk signal. The CPU 10 judges that the control on the transmitted data signal is completed, and at timing T10 at the rise of the clk signal, the data transfer of the second cycle starts. Then, at timing T10 to T13, the same controls at timing T0 to T3 are performed.

Next, similarly to operations performed at timing T3, the detection result from the detection circuit 6 is outputted to the memory control signal generation circuit 4 at timing T13, which is the rising edge of the clk signal at the second period in the second cycle. In this example, the CPU 10 sends an L-state data_out signal (a) and a H-state data_out signal (b) at timing T13 of the second cycle. Therefore, the states of the data_out signals at the buffer side of the data latch 5 are maintained in the same states as controlled in the first cycle. That is, the state of the data_out signal (a) signal line is L, and the state of the data_out signal (b) signal line is H. Also, the signal line on the CPU side of the data latch 5 is in the state that was outputted from the CPU 10 at timing T10. That is, the state on the (a) side is L, and the state on the (b) side is H.

Therefore, when the memory control signal generation circuit 4 compares these detection results, it will judge that the states on the CPU side and the buffer side are the same for both signal lines (a) and (b). In other words, neither the data_out signal (a) nor the data_out signal (b) has changed. Therefore, the memory control signal generation circuit 4 outputs the we# signal, the data_enable signal, and the strobe signal at timing T14. The memory control signal generation circuit 4 also simultaneously outputs the write end signal to the CPU 10. During subsequent timing T14 to T17, the same controls are performed as those at timing T7 to T10.

Figure 5:
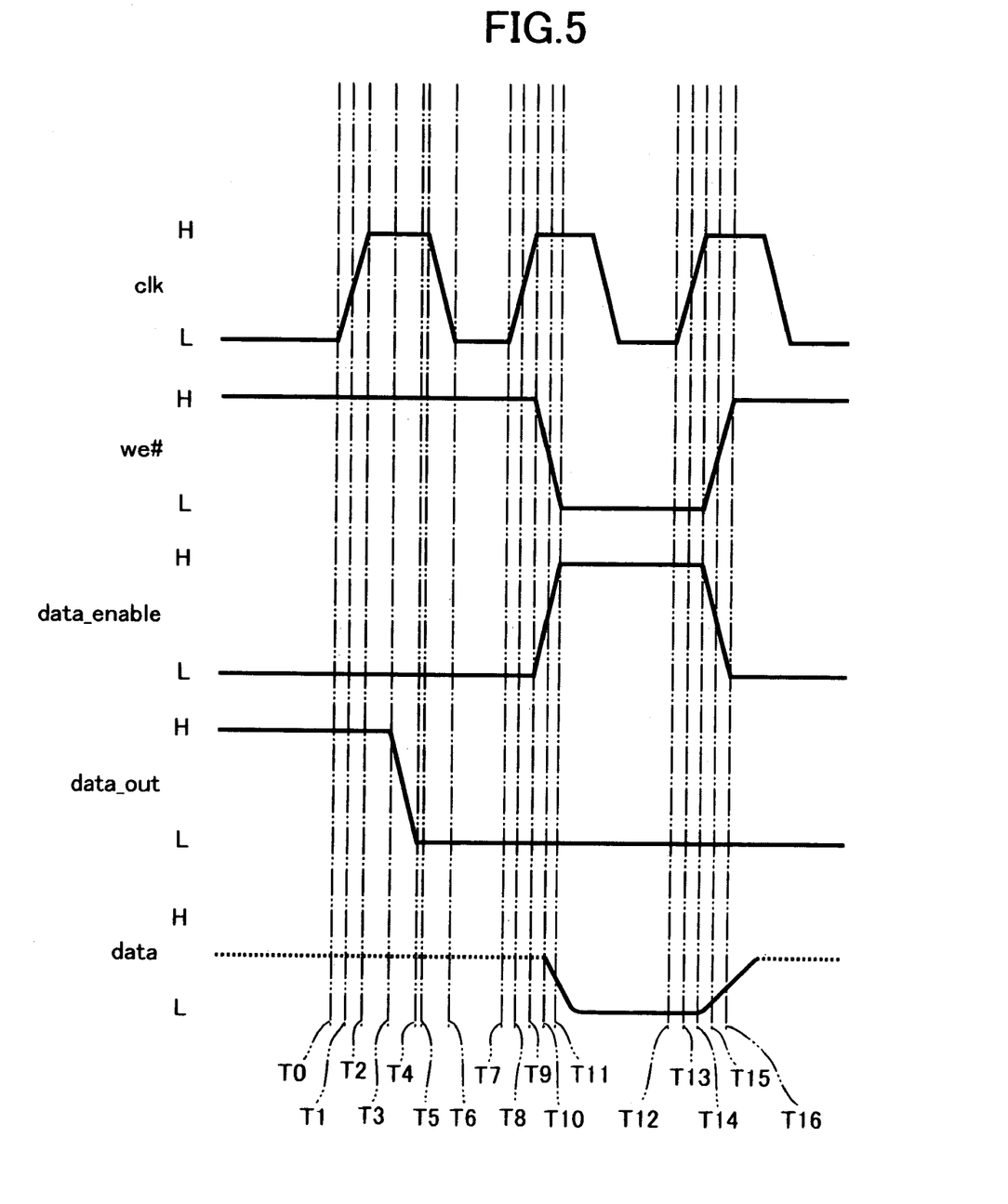
FIG. 5 is a timing chart showing storage of data into the DIMMs delayed because the state of a data_out signal changed.

Next, the delay control performed when the state of the data signal changes will be explained with reference to FIG. 5. FIG. 5 is a timing chart showing the output to the DIMMs 16 and 17 being delayed based on the change in the state of the data_out signal, in the memory control circuit 2.

T1, T3, T4, T8, T9, T11, T13, T14 and timing T16 shown in FIG. 5 correspond respectively to T3, T4, T5, T6, T7, T8, T10, T11 and timing T12 shown in FIG. 4, and controls of each signal at each timing are as described above In this example, "0 " is recorded in into the DIMMs 16 and 17 in a cycle after recording "1" in the previous cycle. Therefore, the state of the data_out signal is H due to the control before timing T0. When the state of the clk signal changes from L to H at timing T0 to T2, the detection circuit 6 outputs the states of the signal lines on the CPU side and the buffer side of the data latch 5 to the memory control signal generation circuit 4, which compares the states.

Because the state of the signal line on the CPU side of the data latch 5 is H and the state of the signal line on the buffer side is L, the memory control signal generation circuit 4 judges that the state of the data signal changed, and so does not output the we# signal and the data_enable signal. However, the strobe signal is outputted to the data latch 5. Therefore, the data latch 5 outputs the latched data signal at timing T3 so that at timing T4 the state of the data_out signal outputted from the data latch 5 to the OUT buffer 7b changes to L. However, the data_enable signal is still in the L state at timing T4, so the data signal is in the state with no output, that is, the high impedance state.

The clk signal changes from H to L at timing T5 to T6, and from L to H at timing T7 to T9 and enters the second period. Because the states of the signal lines on the CPU side and the buffer side of the data latch 5 are both L when the clk signal starts rising at the timing T8, the memory control signal generation circuit 4 outputs the we# signal and the data_enable signal at the timing T9. As a result, the we# signal and the data_enable signal change to their active states (we# signal: L, data_enable signal: H) at timing T9 to T11. The data signal is outputted at this time because the data_enable signal rose at timing T10, so the OUT buffer 7b is no longer in the high impedance state.

The state of the data_out signal has already completed changing from H to L at timing T10, so the state of the data outputted from the OUT butter 7b also changes to L at this timing. The state of the clk signal changes from L to H at timing T12 to T14. The state of the we# signal is L at the rising edge of the third period of the clk signal at timing T13, so the state of the data signal at this timing is referenced, and the data based on the reference, that is, "0", is stored into the DIMMs 16 and 17. The we# signal and the data_enable signal change to the non-active state at timing T14 to T16, so that the data changes to the high impedance state after timing T15.

As explained above, when the CPU 10 send data to be stored into the DIMMs 16 and 17 at a given cycle, the memory control signal generation circuit 4 compares, for all, the data signals, the state during the previous cycle detected by the data control circuit 3 with the state in the current cycle. If even one data signal is in a different state from the previous cycle, then memory control signal generation circuit 4 delays output of the we# signal and the data_enable signal by one period of the clk signal. By delaying output in this manner, the data can be outputted from the OUT buffer 7b after the previously outputted data_out signal has completed changing its state. Consequently, the state of the data signal changes from the high impedance state directly to either an L or H state.

With this configuration, it is possible to avoid the previously described conceivable problem. That is, the state of the data signal does not temporarily change to the opposite state before changing to the proper state. Reflection does not occur so the change amount of the data signal is not influenced. Further, the delay control is not performed when none of the data signals are in a different state from the previous cycle. Therefore, data control in that cycle can be completed more quickly by one clk signal period than when the delay control is performed.

While some exemplary embodiments of this invention have been described in detail, those skilled in the art will recognize that there are many possible modifications and variations which may be made in these exemplary embodiments while yet retaining many of the novel features and advantages of the invention.

For example, the influence of reflection is greater when a data signal changes from H to L than from L to H. Therefore, by performing the delay control only when the states of a data signal changes from H to L, the number of times that the delay control is performed can be decreased. Performance can be improved. In this case, the logical product (AND) of the state of the signal line on the CPU side of the data latch 5 and the negation (NOT) of the state of the signal line on the buffer side thereof is taken, and this result can be used instead of the above-mentioned exclusive logical sum (ExclusiveOR). Said differently, the memory control signal generation unit 4 determines whether the electric potential of the data signal on the CPU side is higher than the electric potential of the latched data signal on the buffer side. If the electric potential of the data signal on the CPU side is higher, then the memory control signal generation unit 4 outputs the strobe signal, but delays outputting the data enable signal and the write enable signal until the next rising edge of the synchronization clock.

The embodiment described performing the delay control even if one of all the data signals is at a different state. However, the data signals outputted from the CPU 10 can be divided into several groups, and if even one delayed data signal exists in the group, the delay control may be performed only on that group.

Figure 6:
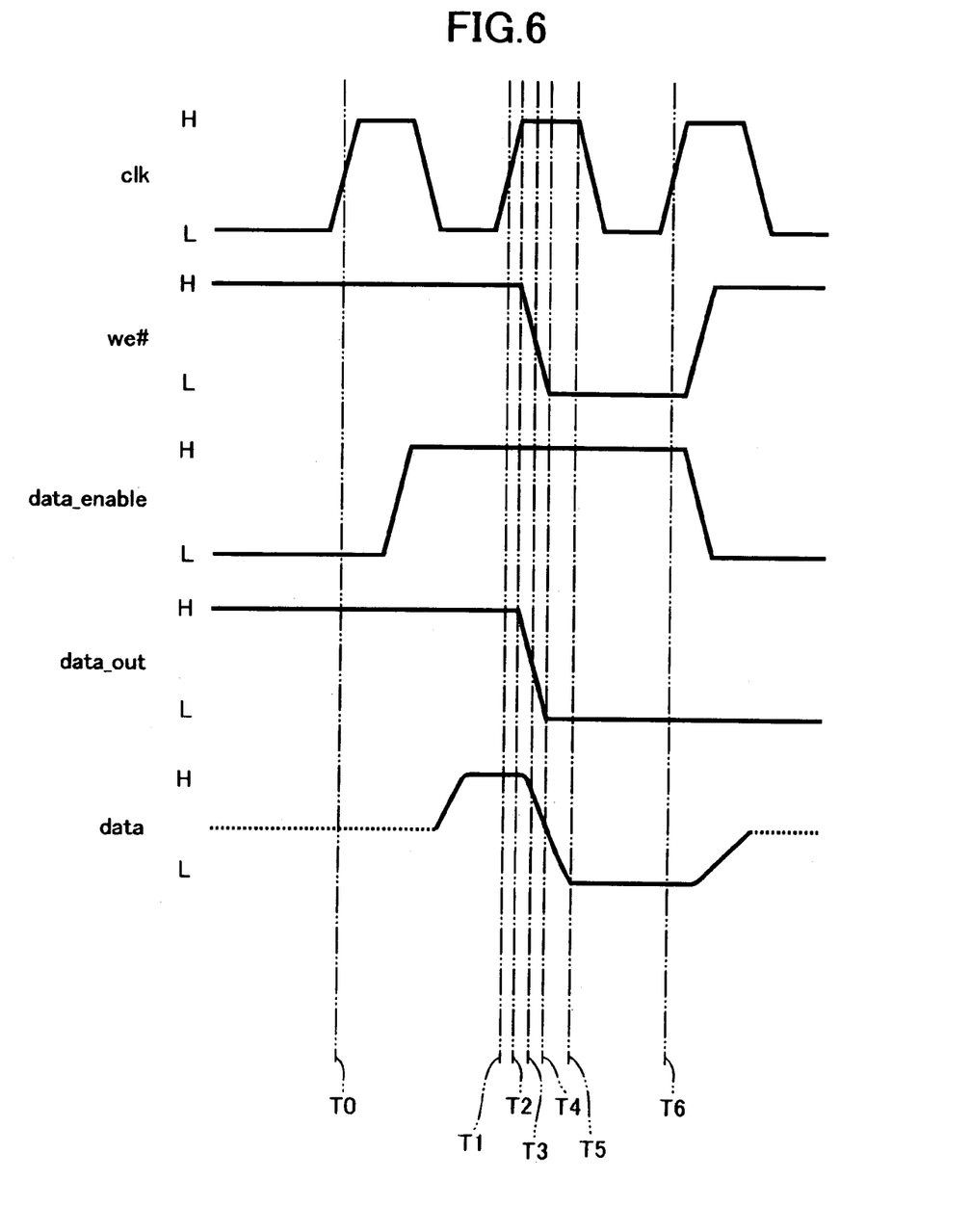
FIG. 6 is a timing chart showing changes in signals controlled according to a modification of the embodiment.

The embodiment described delaying both the we# signal and the data_enable signal However, the memory control signal generation unit 4 may control timing of at least one of output of any output controlling signal for controlling timing that the data controller outputs the latched data signal onto the signal line and output of the we# signal to control timing that the DIMMS 16, 16 store the data signal on the data signal line. For example, when a data signal with a different state from the previous cycle is discovered, the we# signal and the data_out signal may be delayed as shown in the modification of FIG. 6. As shown, of the three signal outputted by the memory control signal generation circuit 4, that is, the strobe signal, the we# signal, and the data_enable signal, only the data_enable signal is outputted at the rise of the first clk signal at timing T0. The we# signal and the data_enable signal are outputted at the rise of the second clk signal at timing T1 and their states actually begin to change at timing T2 to T4. The data signal outputted from the OUT buffer 7*b* changes at timing T3 to T5. With this configuration, the state of the data signal does not momentarily change to H and then suddenly change to L as in the situation described with reference to FIG. 1. Accordingly, the influence of reflection can be suppressed, and the state of the normal data can be read at the rise of the third period of the clk signal at timing T6.

Figure 7:
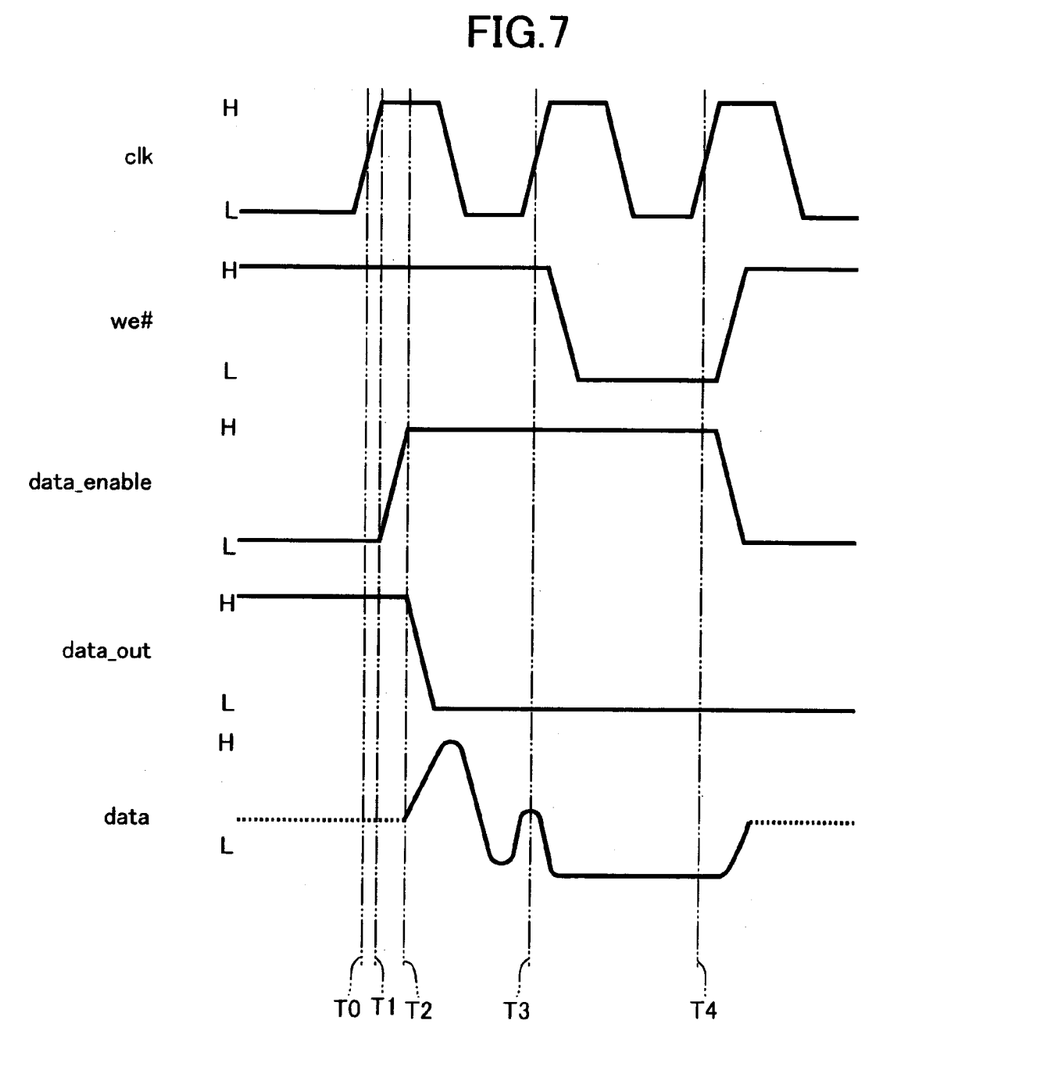
FIG. 7 is a timing chart showing changes in signals controlled according to another modification of the embodiment.

Alternatively, only the we# signal need be delayed when a data signal with a different state from the previous cycle is discovered. As shown in the timing chart in FIG. 7, of the three signal outputted by the memory control signal generation circuit 4, that is, the strobe signal, the we# signal, and the data_enable signal, the strobe signal and the data_enable signal are outputted at the rise of the first clk signal at timing T0. The we# signal is delayed and outputted at timing T3. With this configuration, a reflection is caused by the influence of the delay between the data_enable signal and the data out signal being transmitted to the OUT buffer 7*b*, so that the state of the data signal is in between the high and low states at the rise of the second period of the clk signal at timing T3. However, because the wet# signal is outputted at timing T3, the status of the data signal will be stable by time the third period of the clk signal rises at timing T4. Therefore, the data will be read at a properly state.

Still alternatively, only the data_enable signal need be delayed when a data signal with a different state from the previous cycle is discovered.

Figure 8:
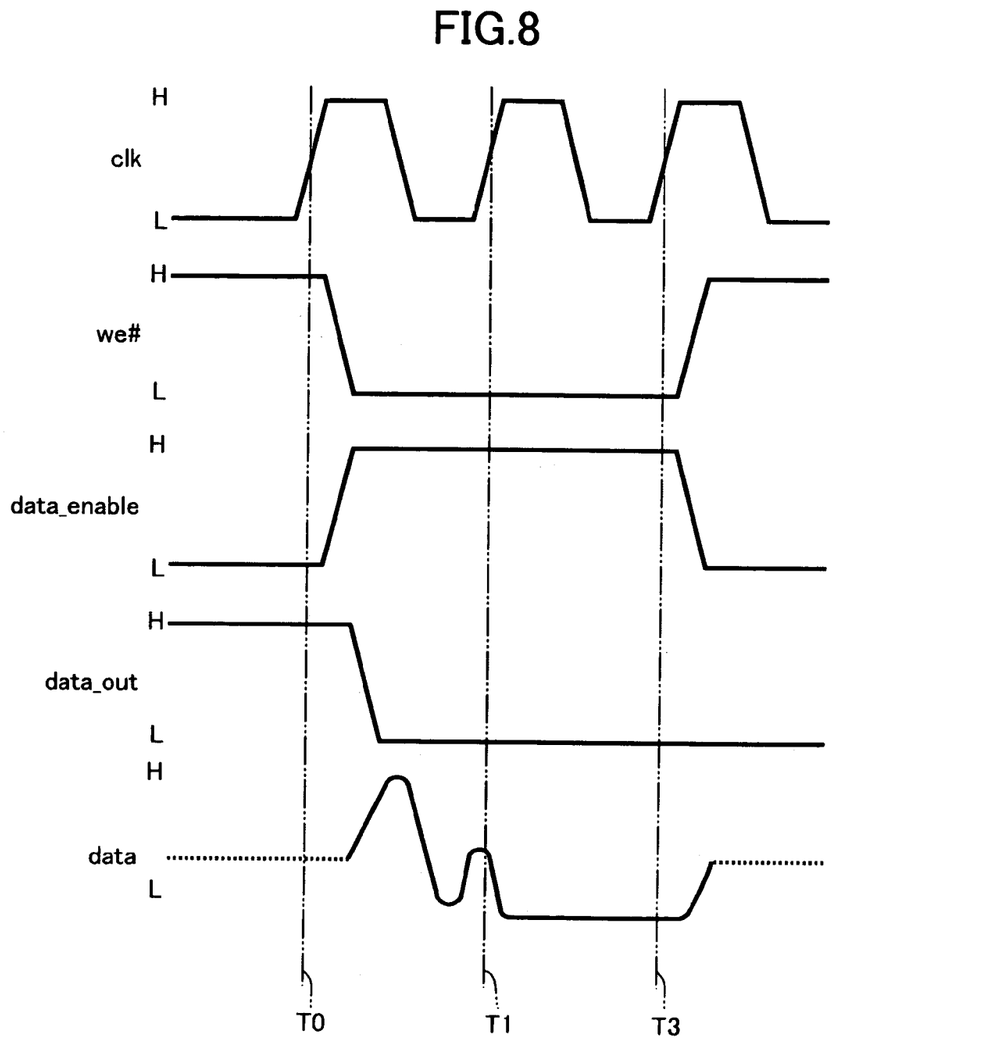
FIG. 8 is a timing chart showing changes in signals controlled according to still another modification of the embodiment.

The wet# signal, the data_enable signal, and the data_out signal may be outputted across two or more periods of the clk signal when a data signal with a different state from the previous cycle is discovered. As shown in the timing chart of FIG. 8, all the control signals outputted by the memory control signal generation circuit 4, including the strobe signal, the we# signal and the data_enable signal, are outputted at the first clk signal rise at timing T0. A reflection is generated because of the delay between the data_enable signal and the data_out signal transmitted to the OUT buffer 7*b*. The reflection influences the data signal at timing T1. Because timing T1 coincides with the rise of the second period of the clk signal, the data signal is stored in the DIMMs 16 and 17, although the data signal is at an improper state (not high or low). However, the data signal is again stored in the DIMMs 16 and 17 the next rise of the third period of the clk signal at timing T3 because the we# signal is outputted for two periods of the clk signal. The state of the data signal has stabilized by timing T3, so the DIMMs 16 and 17 are stored with a proper data signal.

What is claimed is:

1. A memory control device that controls transmission of data signals from a CPU to a memory device based on a synchronization clock that cyclically repeats a predetermined state, the CPU outputting a data signal and a write start signal, the memory control device comprising:

a data controller including a data latch that latches the data signal from the CPU, the data controller outputting the data signal latched in the data latch as a latched data signal;

a signal line for transmitting the data signal outputted from the data controller to the memory device; and a memory control signal generation unit that receives the write start signal from the CPU and the synchronization clock, the memory control signal generation unit, based on the write start signal and the predetermined state of the synchronization clock, generating and outputting an output controlling signal that controls the data controller to output the latched data signal to the signal line and a storage controlling signal that controls the memory device to store the data signal that the data controller outputted to the signal line, the memory control signal generation unit controlling timing of at least one of the output controlling signal that controls timing that the data controller outputs the latched data signal onto the signal line, and the storage controlling signal that controls timing that the memory device stores the data signal on the data signal line.

2. The memory control device as claimed in claim 1, wherein the data controller further includes:

an input line that receives the data signal from the CPU;

a data out line connected to the data latch and that receives the latched data signal output from data latch; and a detector that detects a state of the data signal on the input line and a state of the latched data signal on the data out line;

the memory control signal generation unit, at a present predetermined state of the synchronization clock, comparing the states detected by the detector for the data signal on the input line and the latched data signal on the data out line.

3. The memory control device as claimed in claim 2, wherein the memory control signal generation unit controls timing of output of the storage controlling signal depending on the comparison of the states detected by the detector.

4. The memory control device as claimed in claim 3, further comprising a buffer that receives and stores the latched data signal from the data out line, the buffer further receiving the output controlling signal from the memory control signal generation unit and outputting the latched data signal as a data signal upon receipt of the output controlling signal.

5. The memory control device as claimed in claim 4, wherein the memory control signal generation unit further outputs a strobe signal to the data controller to control the data latch to output the latched data signal to the data out line, the memory control signal generation unit outputting the output controlling signal to the buffer after outputting the strobe signal to the data controller.

6. The memory control device as claimed in claim 4, wherein the memory control signal generation unit further outputs a strobe signal to the data controller to control the data latch to output the latched data signal to the data out line, the memory control signal generation unit outputting the strobe signal to the data controller after outputting the output controlling signal to the buffer.

7. The memory control device as claimed in claim 4, wherein the memory control signal generation unit further outputs a strobe signal to the data controller to control the data latch to output the latched data signal to the data out line, the memory control signal generation unit outputting the strobe signal and the output controlling signal simultaneously at a present predetermined state of the synchronization clock and outputting the storage controlling signal delayed from output of the strobe signal and the output controlling signal to at least a next predetermined state of the synchronization clock.

8. The memory control device as claimed in claim 4, wherein the memory control signal generation unit further outputs a strobe signal to the data controller to control the data latch to output the latched data signal to the data out line, the memory control signal generation unit outputting the strobe signal, the output controlling signal, and the storage controlling signal simultaneously at a present predetermined state of the synchronization clock, the memory control signal generation unit continuing to output the storage controlling signal through a next predetermined state to at least a subsequent predetermined state of the synchronization clock, the subsequent predetermined state being after the next predetermined state.

9. The memory control device as claimed in claim 3, the memory control signal generation unit controlling timing of output of the storage controlling signal when the detector detects different states for the state of the data signal on the input line and the state of the latched data signal on the data out line.

10. The memory control device as claimed in claim 9, wherein the detector detects electric potential of the data signal as the state of the data signal and detects electric potential of the latched data signal as the state of the latched data signal, the memory control signal generation unit controlling timing of output of the storage controlling signal when the electric potential of the data signal on the input line is higher than the electric potential of the latched data signal on the data out line.

11. The memory control device as claimed in claim 3, wherein the input line includes a plurality of input lines simultaneously receiving a plurality of data signals from the CPU, the data latch storing the plurality of data signals and outputting the data signals as a plurality of latched data signals, the data out line including a plurality of data out lines connected to the data latch and receiving the plurality of latched data signals, the detector detecting a state of each of the plurality of data signals and a state of each of the plurality of the latched data signals, the memory control signal generation unit comparing the states detected by the detector for each of the plurality of data signals and each of the plurality of the latched data signals and the memory control signal generation unit controlling timing of output of the storage controlling signal when any of the plurality of data signals is at a different state from a corresponding one of the plurality of the latched data signals.

12. The memory control device as claimed in claim 11, wherein the detector detects electric potential of the data signals as the state of each of the plurality of data signals and detects electric potential of the latched data signals as the state of each of the plurality of the latched data signals, the memory control signal generation unit controlling timing of output of the storage controlling signal when any of the plurality of data signals is at a higher electric potential than electric potential at a corresponding one of the plurality of the latched data signals.

13. A memory control device that controls transmission of data signals from a CPU to a memory device based on a synchronization clock that cyclically repeats a predetermined state, the CPU outputting a data signal and a write start signal, the memory control device comprising:
    an input line that receives the data signal from the CPU;
    a data latch connected to the input line, the data latch latching the data signal from the input line as a latched data signal and outputting the latched data signal;
    a data out line connected to the data latch and that receives the latched data signal output from data latch;
    a buffer that stores the latched data signal from the data out line and outputs the latched data signal as a data signal;
    a signal line connected to the buffer and to the memory device and receiving the data signal output from the buffer;
    a detector that detects a state of the data signal on the input line and a state of the latched data signal on the data outline; and
    a memory control signal generation unit that receives the synchronization clock, the memory control signal generation unit generating and outputting a strobe signal for controlling timing that the data latch outputs the latched data signal, a data enable signal for controlling timing that the buffer outputs the data signal, and a write enable signal for controlling timing that the memory device stores the data signal from the signal line, the memory control signal generation unit, at a present predetermined state of the synchronization clock, compares the states detected by the detector for the data signal on the input line and the latched data signal on the data out line and, when the states of the data signal on the input line and the latched data signal on the data outline are different, outputs the strobe signal at the present predetermined state of the synchronization clock and outputs the data enable signal and the write enable signal at a next predetermined state of the synchronization clock.

14. The memory control device as claimed in claim 13, wherein the detector detects electric potential of the data signal as the state of the data signal and detects electric potential of the latched data signal as the state of the latched data signal, the memory control signal generation unit, when the electric potential of the data signal on the input line is higher than the electric potential of the latched data signal on the data out line, outputs the strobe signal at the present predetermined state of the synchronization clock and outputs the data enable signal and the write enable signal at the next predetermined state of the synchronization clock.

* * * * *